United States Patent
Yang et al.

(10) Patent No.: US 10,174,187 B2
(45) Date of Patent: Jan. 8, 2019

(54) ROOM TEMPERATURE CROSSLINKED TYPE HALOGEN-FREE FLAME RETARDANT RESIN COMPOSITION, AND METHOD OF PREPARING THE SAME

(71) Applicant: DYM SOLUTION CO., LTD., Chungcheongnam-do (KR)

(72) Inventors: Jong Seok Yang, Chungcheongnam-do (KR); Eun Ho Choi, Chungcheongnam-do (KR); Chan Ryoo, Chungcheongnam-do (KR); Baeg Yong Seong, Chungcheongbuk-do (KR); Dong Ha Park, Seoul (KR)

(73) Assignee: DYM SOLUTION CO., LTD., Chuncheongnam-do (KR)

( * ) Notice: Subject to any disclaimer, the term of this patent is extended or adjusted under 35 U.S.C. 154(b) by 112 days.

(21) Appl. No.: 15/244,953

(22) Filed: Aug. 23, 2016

(65) Prior Publication Data

US 2017/0058113 A1    Mar. 2, 2017

(30) Foreign Application Priority Data

Aug. 25, 2015 (KR) .......................... 10-2015-0119632

(51) Int. Cl.
    *C08L 23/06*    (2006.01)
    *C08J 3/22*    (2006.01)
(52) U.S. Cl.
    CPC ............... *C08L 23/06* (2013.01); *C08J 3/226* (2013.01); *C08J 2323/06* (2013.01); *C08J 2423/06* (2013.01)

(58) Field of Classification Search
    CPC ......... C08L 23/06; C08J 3/226; C08J 2323/06
    See application file for complete search history.

(56) References Cited

U.S. PATENT DOCUMENTS

2013/0161064 A1*   6/2013  Shimada ................. C08L 23/02
                                                     174/113 R

FOREIGN PATENT DOCUMENTS

KR    1020100002650 A    1/2010

OTHER PUBLICATIONS

Machine Translation of KR 10-20080062620 (Year: 2008).*

* cited by examiner

*Primary Examiner* — Hannah J Pak
(74) *Attorney, Agent, or Firm* — McCoy Russell LLP

(57) ABSTRACT

Provided are a room temperature crosslinked type halogen-free flame retardant resin composition and a method of preparing the same. Specifically, a room temperature crosslinked type halogen-free flame retardant resin composition according to the present invention including a polyethylene resin, a olefin-based elastomer, a metal hydroxy compound, a radical initiator, a crosslinked type alkoxysilane-based compound, a condensation catalyst of the crosslinked type alkoxysilane-based compound, and one or more crosslinking aids selected from the group consisting of an aliphatic acid and an aliphatic acid metal salt, and a method of preparing the same are provided. Further, a compound material and a masterbatch which are compositions for preparing the room temperature crosslinked type halogen-free flame retardant composition, and methods of preparing the same are provided.

10 Claims, No Drawings

ROOM TEMPERATURE CROSSLINKED TYPE HALOGEN-FREE FLAME RETARDANT RESIN COMPOSITION, AND METHOD OF PREPARING THE SAME

CROSS-REFERENCE TO RELATED APPLICATIONS

This application claims priority under 35 U.S.C. § 119 to Korean Patent Application No. 10-2015-0119632, filed on Aug. 25, 2015, in the Korean Intellectual Property Office, the disclosure of which is incorporated herein by reference in its entirety.

TECHNICAL FIELD

The following disclosure relates to a halogen-free flame retardant resin composition, and a method of preparing the same, and also, to a compound material and a masterbatch for the composition, and methods of preparing the same.

BACKGROUND

As an environmentally friendly halogen-free flame retardant product which replaces conventional polyvinyl chloride (PVC) materials, and does not use heavy metal compounds such as lead, cadmium, hexavalent chromium, and thus, is safe and less causes earth environmental pollution has come in the spotlight, the demand and importance thereof are gradually expanded.

However, in spite of the domestic and international mandatory environmental regulations, the traditional PVC market does not easily shift to halogen-free flame retardant materials, because the halogen-free flame retardant materials have properties such as high price, not easy workability, a lack of flame retarding technique, and deteriorated flexibility, as compared with PVC.

Particularly, most of the halogen-free products which was crosslinked for increasing thermal resistance, use peroxide crosslinking (chemical crosslinking), electron beam irradiation crosslinking, and water crosslinking methods, and thus, investment in expensive equipment and securing space are required, and these become the factors to inhibit the shift to the halogen-free material product market.

Among the crosslinking methods, the peroxide crosslinking needs expensive crosslinking equipment using a heat medium such as steam, high-frequency and gas, in order to carry out crosslinking by a free radical reaction at high temperature. In addition, in the electron beam irradiation crosslinking, the crosslinking reaction is performed by a radical bonding of high molecular chains produced by high energy electron beam irradiation, which also requires expensive electron beam irradiation equipment. In addition, though the water crosslinking uses a common thermoplastic extruder without investment in expensive equipment for crosslinking, differently from the peroxide crosslinking or the electron beam irradiation crosslinking method, it requires a separate crosslinking process such as immersion in hot water (generally at high temperature of 80° C. or higher) which is separate energy, or exposure to water vapor (steam), which actually requires much more equipment, and high costs for production.

Therefore, due to the problems of the conventional techniques, there has emerged the need to develop a room temperature crosslinking technique capable of producing halogen-free products in general PVC extrusion lines, without investment in CCV (Catenary Continuous Vulcanizing) equipment which is expensive crosslinking equipment, expensive electron beam irradiation equipment, or hot water equipment, thereby developing a halogen-free room temperature crosslinking flame retardant compound material for electrical insulation which is harmless to environment and people, and does not consume extra energy when crosslinking, while satisfying oil resistance, heat resistance, flexibility, electrical insulation and flame resistance.

Accordingly, herein, in order to improve the problems as described above, a room temperature crosslinked type halogen-free flame retardant resin composition has been developed, thereby, providing a novel composition for wires or cables which, after being manufactured into wires or cables by extrusion, may proceed with the crosslinking reaction continuously at room temperature, without a separate crosslinking process, so as to significantly increase long-term mechanical physical properties. Further, the present invention provides a compound material which is a composition for providing the room temperature crosslinked type halogen-free flame retardant resin composition, and a method of preparing the same. Further, the present invention provides a masterbatch for providing the room temperature crosslinked type halogen-free flame retardant resin composition, and a method of preparing the same.

SUMMARY

An embodiment of the present invention is directed to providing a room temperature crosslinked type halogen-free flame retardant resin composition which may particularly fundamentally exclude a separate water crosslinking process, and the like requiring a conventional crosslinking reaction with high energy and high cost.

Another embodiment of the present invention is directed to providing a novel room temperature crosslinked type halogen-free flame retardant resin composition which maintains excellent physical property balance such as physical properties, aging physical properties and oil resistant physical properties, improves the flame retardancy and flexibility of wires, and does not lower the physical properties even in the case of long-term use.

Still another embodiment of the present invention is directed to providing a compound material and a masterbatch which are a composition for providing the room temperature crosslinked type halogen-free flame retardant resin composition, and methods of preparing the same.

Still another embodiment of the present invention is directed to providing a halogen-free flame retardant resin composition which may exist in various forms such as in a mixed state of the masterbatch and the compound material, in a melt-kneaded state thereof, in a melted and extruded state thereof, a molded state thereof, or a pelletized state thereof.

In one general aspect, a crosslinked type halogen-free flame retardant resin composition which crosslinks rapidly even at room temperature, and has an adjustable crosslinking rate includes a polyethylene resin, olefin-based elastomer, a metal hydroxy compound (metal hydroxide), a radical initiator, a crosslinked type alkoxysilane-based compound, a condensation catalyst of a crosslinked type alkoxysilane-based compound, and one or more crosslinking aids selected from the group consisting of an aliphatic acid and an aliphatic acid metal salt.

The present applicant was the first to find out that the flame retardant resin composition of the present invention is combined with the composition to have very uniform appearance or surface shape, very accelerated curing time at room temperature, and sufficiently exert mechanical physical properties and the like.

In another general aspect, as a compound composition for providing the room temperature crosslinked type halogen-free flame retardant resin composition, a compound material including a polyethylene resin, a olefin-based elastomer, a metal hydroxy compound, a crosslinked type alkoxysilane-based compound and a radical initiator, and a method of preparing the same are provided.

In another general aspect, in order to provide the room temperature crosslinked type halogen-free flame retardant resin composition, a masterbatch (catalyst masterbatch) which is mixed with the compound material, including a polyethylene resin, a condensation catalyst of a crosslinked type alkoxysilane-based compound, and one or more crosslinking aids selected from the group consisting of an aliphatic acid and an aliphatic acid metal salt, and a method of preparing the same are provided.

The room temperature crosslinked type halogen-free flame retardant resin composition may be prepared by including preferably, 10 to 100 parts by weight of an olefin-based elastomer, 20 to 300 parts by weight of a metal hydroxy compound, 0.1 to 30 parts by weight of a crosslinked type alkoxysilane-based compound, 0.01 to 3 parts by weight of a radical initiator, 0.00001 to 3 parts by weight, more preferably 0.0001 to 0.5 parts by weight of a condensation catalyst of a crosslinked type alkoxysilane-based compound, and 0.0001 to 10 parts by weight, preferably 0.001 to 1 part by weight of a crosslinking aid, in 100 parts by weight of the polyethylene resin, though the contents are not significantly limited in the range for the purpose of the present invention.

The crosslinking aid is a component allowing room temperature crosslinking, and the example is not limited as long as the room temperature crosslinking to be desired in the present invention (crosslinking occurring in the natural state such as storing at room temperature) sufficiently occurs, but for example, a C4 to C20 straight chain or branched aliphatic acid is preferred. Further, the content thereof is not limited in the range achieving the purpose of the present invention, but as a specific example, it is more preferred that 0.0001 to 10 parts by weight, preferably 0.001 to 1 part by weight is included, thereby further facilitating the room temperature crosslinking reaction and intending improvement of physical properties.

In another general aspect, methods of preparing the room temperature crosslinked type resin composition, and the compound material and the masterbatch for preparing the same are provided.

First, in an exemplary embodiment of the present invention, the room temperature crosslinked type halogen-free flame retardant resin composition of the present invention may be prepared by including: i) mixing components including a polyethylene resin, an olefin-based elastomer, a metal hydroxy compound, a crosslinked type alkoxysilane-based compound, and a radical initiator, so as to prepare a composition, ii) kneading the composition to graft the crosslinked type alkoxysilane-based compound, iii) after the kneading, performing pelletization to prepare a compound material, iv) kneading-extruding a composition including a polyethylene resin, a condensation catalyst of a crosslinked type alkoxysilane-based compound, and one or more crosslinking aids selected from the group consisting of an aliphatic acid and an aliphatic acid metal salt, to prepare a masterbatch, and v) mixing, kneading or extruding the compound material and the masterbatch.

In an exemplary embodiment of the present invention, in order to provide the preparation method, a compound material capable of being previously prepared may be used, and a method of preparing the same is as follows. That is, the compound material may be previously prepared by including: i) preparing components including a polyethylene resin, an olefin-based elastomer, a metal hydroxy compound, a crosslinked type alkoxysilane-based compound, and a radical initiator, ii) kneading the component to graft the crosslinked type alkoxysilane-based compound, and iii) after kneading, performing pelletization by extrusion to prepare a compound material, which may be used by mixing with a masterbatch.

As to the compositional ratio of each component when preparing the compound material, the content is not significantly limited, in the range for the purpose of the present invention, and the compound material may be prepared by mixing 10 to 100 parts by weight of the olefin-based elastomer, 20 to 300 parts by weight of the metal hydroxy compound, 0.1 to 30 parts by weight of the crosslinked type alkoxysilane-based compound, and 0.01 to 3 parts by weight of the radical initiator, in 100 parts by weight of the polyethylene resin, and performing grafting.

The compound material refers to a mixed composition in the form of a crosslinked type alkoxysilane-based compound grafted to one or more selected from the group consisting of a polyethylene resin and an olefin-based elastomer, prepared by mixing a polyethylene resin, an olefin-based elastomer, a metal hydroxy compound, a crosslinked type alkoxysilane-based compound and a radical initiator, and heating the mixture.

Further, the room temperature crosslinked type halogen-free flame retardant resin composition herein may be prepared by separately preparing the masterbatch to be mixed with the compound material, and then mixing the masterbatch with the compound material, and the preparation method of the masterbatch of the present invention is as follows.

The masterbatch may be prepared by including mixing a polyethylene resin, a condensation catalyst of a crosslinked type alkoxysilane-based compound (room temperature crosslinking catalyst), one or more crosslinking aids selected from the group consisting of an aliphatic acid and an aliphatic acid metal salt, and an antioxidant, and kneading-extruding the mixture to be pelletized. Though the compositional ratio of the mixture is not significantly limited in the range for the purpose of the present invention, the mixture may be prepared by including, for example, 0.1 to 20 parts by weight of the condensation catalyst which allows a condensation reaction of the alkoxy groups of the crosslinked type alkoxysilane-based compound grafted in the compound material to crosslink the alkoxysilane-based compound, 1 to 80 parts by weight of the crosslinking aid, and 5 to 80 parts by weight of the antioxidant, in 100 parts by weight of the polyethylene resin, but not limited thereto.

In the case of preparing the compound material for the room temperature crosslinked type halogen-free flame retardant compound composition herein, the grafting reaction is carried out by performing kneading at a temperature of 170 to 230° C. in a certain area of a kneading zone of a separate kneading apparatus or an extruder, and performing extrusion at a temperature of 130 to 200° C. through the extruder, to perform pelletization, but the extrusion temperature and grafting temperature are not limited in the range for the purpose of the present invention.

The reaction time of the grafting reaction herein is not limited, but the grafting is performed by kneading for preferably 10 to 30 minutes. However, it is not limited thereto in the range for the purpose of the present invention.

Further, the extrusion condition of the compound material or the masterbatch herein is not significantly limited as long as it is near the melting condition of resin components, but by way of example, extrusion may be performed at a temperature of about 130 to 200° C., preferably 140 to 180° C.

Further, the flame retardant resin composition of the present invention may be manufactured into various forms by putting the compound material and the masterbatch as prepared above into an extruder for manufacturing cables at an appropriate ratio, or putting them thereinto and performing kneading, or kneading and then extruding them, thereby completing cables. In particular, herein, the compound material and the masterbatch are kneaded, thereby being naturally crosslinked at room temperature in a natural state, without a crosslinking reaction by separate expensive equipment and a water crosslinking process of high processing costs, regardless of whether the product is a pellet, a sheath of a cable, or another molded article, so as to achieve the desired effect of the present invention.

The room temperature crosslinked type halogen-free flame retardant resin composition herein may be prepared by preparing the masterbatch and the compound material, and then mixing them so as to have the compositional ratio of the room temperature crosslinked type halogen-free flame retardant resin composition, for the purpose of the present invention. Thus, the mixing ratio of the compound material and the masterbatch is appropriately adjustable, and for example, the catalyst masterbatch is mixed with the compound material at a weight ratio in a range of approximately 0.1 to 10 relative to 100 parts by weight of the compound material, and the mixture is kneaded, thereby completing preparation, but not necessarily limited thereto.

Further, as another exemplary embodiment of the present invention, the compound material and the catalyst masterbatch may be prepared separately, as described above, and then, when manufacturing cables, be mixed, and used as the raw materials of a cable sheath, and the like. However, the polyethylene resin, the olefin-based elastomer, the metal hydroxy compound, the crosslinked type alkoxysilane-based compound, the radical initiator, the condensation catalyst of the crosslinked type alkoxysilane-based compound (room temperature crosslinking catalyst), and the crosslinking aid may be all put together thereinto, and kneaded and extruded. In this case, generally, they may be usefully used in the process of mixing in the extruder for manufacturing cables, and directly manufacturing cables simultaneously with kneading and extrusion.

In an exemplary embodiment of the present invention, the preparation method in the above case may include i) mixing a composition including a polyethylene resin, an olefin-based elastomer, a metal hydroxy compound, a crosslinked type alkoxysilane-based compound, a radical initiator, a condensation catalyst of a crosslinked type alkoxysilane-based compound, and a crosslinking aid, ii) kneading the composition to graft the condensation catalyst of the crosslinked type alkoxysilane-based compound, and iii) after the kneading, performing pelletization.

Even in the above case, the composition may be the room temperature crosslinked type halogen-free resin composition prepared by preferably including 10 to 100 parts by weight of the olefin-based elastomer, 20 to 300 parts by weight of the metal hydroxy compound, 0.1 to 30 parts by weight of the crosslinked type alkoxysilane-based compound, 0.01 to 3 parts by weight of the radical initiator, 0.00001 to 3 parts by weight, more preferably 0.0001 to 0.5 parts by weight of the condensation catalyst of the crosslinked type alkoxysilane-based compound, and 0.0001 to 10 parts by weight, preferably 0.001 to 1 part by weight of the crosslinking aid, though the contents are not limited in the range for achieving the purpose of the present invention.

In an exemplary embodiment of the present invention, the polyethylene resin is not significantly limited, and for example, may include one or more selected from the group consisting of linear low-density polyethylene (LLDPE), medium-density polyethylene (MDPE), low-density polyethylene (LDPE), and the like. The polyethylene resin is used as a matrix resin, and may be combined with the olefin-based elastomer and other components to impart sufficient flame retardancy and flowability. Further, it generates a graft reaction with the vinyl group of the crosslinking agent by the radical initiator compound, thereby representing the physical properties as the sheath of the present invention well. In the case that the resin such as high-density polyethylene or polypropylene is used as the matrix resin, the sufficient physical properties to be desired in the present invention were not able to be provided, and thus, excellence of selection of the matrix resin of the present invention may be understood well.

In an exemplary embodiment of the present invention, the olefin-based elastomer is important, since it allows thermal crosslinking performed at extrusion of the present invention to be carried out well, and facilitates the mechanical strength and the crosslinking reaction of the present invention.

The olefin-based elastomer may be selected from the group consisting of a polyethylene-based elastomer, a polypropylene-based elastomer and the like, though not particularly limited thereto, and as a specific example thereof may include one or more selected from the group consisting of ethylene-propylene copolymer rubber, ethylene-1-butene copolymer rubber, ethylene-1-hexene copolymer rubber, ethylene-1-octene copolymer rubber, ethylene-propylene-1-butene copolymer rubber, ethylene-propylene-1-hexene copolymer rubber, ethylene-propylene-1-octene copolymer rubber, ethylene-propylene-5-ethylidene-2-norbornene copolymer rubber, ethylene-propylene-dicyclopentadiene copolymer rubber, ethylene-propylene-1,4-hexadiene copolymer rubber, ethylene-propylene-5-vinyl-2-norbornene copolymer rubber and the like. The content of the elastomer is not significantly limited, however, in order to further improve the purpose of the present invention, it is preferred to use 10 to 100 parts by weight of the elastomer, based on 100 parts by weight of the polyethylene resin.

In an exemplary embodiment of the present invention, as the metal hydroxy compound which imparts the flame retardancy of the present invention, various compounds may be used, for example, one or more selected from the group consisting of metal hydroxy compounds, specifically, aluminum hydroxide, magnesium hydroxide and calcium hydroxide may be included. The content of the metal hydroxy compound is not limited within the range achieving the purpose of the present invention, and may be used in 20 to 300 parts by weight, based on 100 parts by weight of the polyethylene resin, but not limited thereto.

In an exemplary embodiment of the present invention, the crosslinked type alkoxysilane-based compound is a component grafted to the polyethylene resin or the olefin-based elastomer, and is not limited as long as it is, for example, the alkoxysilane-based compound containing a vinyl group or (meth)acryloyl group or an allyl group. For example, it may be various silane-based compounds including one or more selected from the group consisting of vinyltrimethoxysilane, vinyltriethoxysilane, allyltrimethoxysilane, allyltriethoxysilane, vinylmethyldimethoxysilane, vinyl tris(2-ketoxyethoxy)silane and methacryloyloxypropyl-trimethoxysilane, and the like and is not limited as long as it has a functional group capable of grafting to the radical initiator and the matrix resin. The functional group (crosslinkable group) undergoes a graft reaction with the polyethylene resin or the olefin-based elastomer by the radical initiator which is a thermal initiator, during kneading in a separate vessel or an extruder before extrusion, and thereafter, forms a bridge of a silane group by the reaction between the alkoxy groups by a catalyst, thereby serving to increase the physical properties of the composition of the present invention. The content of the crosslinked type alkoxysilane-based compound is not limited within the range achieving the purpose of the present invention, and may be used in 0.1 to 30 parts by weight, based on 100 parts by weight of the polyethylene resin, but not limited thereto.

In an exemplary embodiment of the present invention, the radical initiator is not limited, but for example, includes a ketone radical initiator, a diacyl radical initiator, a hydro radical initiator, a dialkyl radical initiator, peroxyketal, alkyl perester, percarbonate, peroxydicarbonate, peroxyester and the like. The specific example of organic peroxides includes one or a combination of two or more selected from the group consisting of a dicumyl radical initiator, 2,5-dimethyl-2,5-di-(tert-butylperoxy)hexane, 2,5-dimethyl-2,5-di-(tert-butylperoxy)hexyne, 1,3-bis(tert-butylperoxyisopropyl)benzene, a tert-butyl cumyl radical initiator, a di-tert-butyl radical initiator, a 2,2,4-trimethylpentyl-2-hydroradical initiator, a diisopropylbenzohydroradical initiator, a cumene radical initiator, a tert-butyl radical initiator, 1,1-di-tert-butylperoxy-3,5,5-trimethylcyclohexane, 1,1-di-tert-butylperoxycyclohexane, an isobutyl radical initiator, a 2,4-dichlorobenzoyl radical initiator, an o-methylbenzoyl radical initiator, a bis-3,5,5-trimethylhexanoyl radical initiator, a lauroyl radical initiator, a benzoyl radical initiator, a p-chlorobenzoyl radical initiator and the like. The content of the peroxide herein is not limited within the range achieving the purpose of the present invention, and may be used in 0.01 to 3 parts by weight, based on 100 parts by weight of the polyethylene resin, but not necessarily limited thereto.

In an exemplary embodiment of the present invention, as the condensation catalyst of the crosslinked type alkoxysilane-based compound which allows the crosslinking reaction between alkoxysilanes or hydroxysilanes, for example, one or two or more selected from the group consisting of dialkyltin dialkylate such as di-n-butyltin dilaurate, dodecylbenzenesulfonic acid, 2,2-dibutyl-1,3,2-dioxastannolane and the like may be used. The content of the compound is not limited, and for example, may be adjusted at a content of 0.00001 to 3 parts by weight, based on 100 parts by weight of the polyethylene resin, but not necessarily limited thereto.

In an exemplary embodiment of the present invention, as the crosslinking aid which is bound to the room temperature crosslinking catalyst to accelerate a room temperature crosslinking rate, it is more preferred that a C4 to C20 aliphatic acid or aliphatic acid metal salt component is used, but not particularly limited thereto. As the example of the above component of the present invention, lauric acid, stearic acid, or the metal salts thereof with magnesium, calcium or the like may be listed, but not limited thereto. In the halogen-free room temperature crosslinked type flame retardant composition of the present invention, the content of the crosslinking aid is not limited within the range achieving the purpose of the present invention, and 0.0001 to 10 parts by weight, preferably 0.001 to 1 part by weight, based on 100 parts by weight of the polyethylene resin may be adopted, but not necessarily limited thereto.

In an exemplary embodiment of the present invention, the room temperature crosslinked type halogen-free flame retardant resin composition may further include an additive, such as inorganic fillers (e.g., talc, calcium carbonate and calcined kaolin), organic fillers (e.g., fibers, wood flour and cellulose powder), antioxidants (e.g., phenol-based, sulfur-based, phosphorus-based, lactone-based and vitamin-based antioxidants), a weatherability stabilizer, UV absorbents (e.g., benzotriazole-based, triazine-based, anilide-based and benzophenone-based UV absorbents), a thermal stabilizer, light stabilizers (e.g., hindered amine type light stabilizers and benzoate type light stabilizers), an antistatic agent, a nucleating agent, a pigment, adsorbent (e.g., metal oxides such as zinc oxide and magnesium oxide), metal chlorides (e.g., ferric chloride and calcium chloride), hydrotalcite, aluminate, lubricants (e.g., aliphatic acids, higher alcohols, aliphatic amide and aliphatic ester), and silicone compounds, in addition to the above components, as long as the additive does not inhibit the purpose of the present invention.

The sheath or cable manufactured using the composition prepared by the present invention meets the IEC 60092-360 SHF2 standards, and may have particularly excellent physical properties for a sheath of wires for ships. LV (low voltage) to EHV (extra high voltage) wires and cables manufactured by the composition are applicable for both electric power and communication, and may be utilized as the sheath of wires and cables used for electric power control in a building and a factory.

Other features and aspects will be apparent from the following detailed description and the claims.

DETAILED DESCRIPTION OF EMBODIMENTS

The advantages, features and aspects of the present invention will become apparent from the following description of the embodiments which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, the room temperature crosslinked type halogen-free flame retardant resin composition and the method of preparing the same of the present invention will be described in detail.

The description herein is an example for sufficiently conveying the spirits of the present invention to a person skilled in the art, and may not be limited or embodied in other forms in order to clarify the spirits of the present invention.

In addition, technical terms and scientific terms used in the present invention have the general meaning understood by a person skilled in the art unless otherwise defined, and a description for the known function and configuration unnecessarily obscuring the gist of the present invention will be omitted in the following description.

Further, unless otherwise stated, the unit of % herein refers to % by weight.

Hereinafter, the present invention will be described in detail by way of Examples, however, the Examples are for describing the present invention in more detail, and the scope of the present invention is not limited to the following Examples.

Example 1

43 parts by weight of an ethylene-alpha-olefin copolymer elastomer (MI 3.6, 190° C./2.16 kg), 157 parts by weight of magnesium hydroxide, 7 parts by weight of vinyl trimethoxysilane, 0.17 parts by weight of a dicumyl radical initiator, 1.4 parts by weight of tetrakis-methylene(3,5-di-tert-butyl-4-hydroxycinnanate)-methane as a phenol-based antioxidant, 0.7 parts by weight of a dimethyl succinate-1-(2-hydroxymethyl)-2,2,6,6-tetramethyl-4-piperidinol copolymer as an amine-based light stabilizer, 0.3 parts by weight of benzene propanoic acid as an antioxidant, 4.3 parts by weight of polyethylene wax (Tm 124° C.) as a lubricant, and 2.8 parts by weight of silicone oil (viscosity 200 cs), in 100 parts by weight of a linear low-density polyethylene (LLDPE)(MI 2.8, 190° C./2.16 kg) and 100 parts by weight of the resin were mixed and kneaded at a temperature of 190° C. for 20 minutes, in a 3 l/batch of a kneading apparatus (DISPERSION KNEADER, available from Fine Machinery Ind. Co., Ltd., Republic of Korea) to be subjected to a grafting reaction. Then, the kneading-completed product was extruded using a T-die, under the temperature condition of a hopper at 150° C., cylinder 1 at 155° C., cylinder 2 at 160° C., and dies at 165° C., in an extruder having a diameter of Φ50 (EXTRUDER, available from Fine Machinery Ind. Co., Ltd., Republic of Korea), thereby preparing a compound material in the form of pellet.

In addition, 2.5 parts by weight of dibutyltin laurate as a room temperature crosslinking catalyst of an alkoxysilane group, 10 parts by weight of tetrakis-methylene(3,5-di-tert-butyl-4-hydroxycinnamate)-methane, and 20 parts by weight of magnesium stearate, in 100 parts by weight of the polyethylene resin (LLDPE, MI 2.8, 190° C./2.16 kg) were mixed, extruded under the same condition as the above extrusion, and pelletized to prepare a masterbatch. Then, 97% by weight of the compound material, and 3% by weight of the masterbatch were mixed, and extruded, thereby preparing a specimen usable as a sheath for wires. The results of measuring the physical properties of the specimen are listed in Table 1.

Example 2

Preparation was carried out in the same manner as in Example 1, except that stearic acid was used as the catalyst masterbatch, instead of magnesium stearate. The results are listed in Table 1.

Example 3

Preparation was carried out in the same manner as in Example 1, except that 1.25 parts by weight of magnesium stearate and 1.25 parts by weight of stearic acid were used when preparing the catalyst masterbatch, instead of magnesium stearate. The results are listed in Table 1.

Comparative Example 1

Preparation was carried out in the same manner as in Example 1, except that the catalyst masterbatch was prepared without using magnesium stearate and steric acid. The results are listed in Table 1.

TABLE 1

|  |  | Example 1 | Example 2 | Example 3 | Comparative Example 1 |
|---|---|---|---|---|---|
| Room temperature | Tensile strength (MPa) | 15.0 | 15.7 | 15.1 | 15.9 |
|  | Elongation (%) | 170 | 165 | 168 | 170 |
| After heating | Tensile retention (%) | 100 | 88 | 99 | 97 |
| (135° C., 168 hrs) | Elongation retention (%) | 99 | 86 | 95 | 92 |
| After oil resistance | Tensile retention (%) | 74 | 67 | 67 | 68 |
| (100° C., 24 hrs) | Elongation retention (%) | 99 | 90 | 94 | 96 |
| HOT SET | After 3 days | Hot(%) | broken | 200 | 230 | broken |
|  |  | Set(%) | broken | 70 | 75 | broken |
|  | After 1 week | Hot(%) | 200 | 150 | 180 | broken |
|  |  | Set(%) | 60 | 35 | 50 | broken |
|  | After 2 weeks | Hot(%) | 150 | 115 | 140 | broken |
|  |  | Set(%) | 30 | 22 | 25 | broken |
|  | After 3 weeks | Hot(%) | 140 | 115 | 130 | broken |
|  |  | Set(%) | 25 | 20 | 21 | broken |
|  | After 4 weeks | Hot(%) | 130 | 110 | 120 | 350 |
|  |  | Set(%) | 22 | 18 | 20 | 70 |
| Extrusion property (exterior) |  | — | — | very good | good | good | good |

(1) Tensile strength/elongation: measurement was carried out according to IEC 60811-501, while maintaining a tensile rate at 200 mm/min.

(2) Properties after heating: according to IEC 60811-401, a dumbbell shape specimen was left at 135° C. for 168 hours, and then the rates of change in tensile strength and elongation were measured.

(3) Properties after oil resistance: according to IEC 60811-404, a dumbbell shape specimen was left in ASTM #2 oil at 100° C. for 24 hours, and then the rates of change in tensile strength and elongation were measured.

(4) Hot set: according to IEC 60811-507, a load of 20 N/cm² was applied at 200° C., and measurement was carried out under the condition of Hot (20 N/cm², 15 min)/Set (0

N/cm², 5 min), thereby evaluating the crosslinking properties. That is, after standing the extruded specimen at room temperature for 1 to 4 weeks, increased length and contracted length with or without a load at 200° C. were measured using the specimen, thereby relatively comparing the crosslinking degree with time. That is, Hot (%) refers to the increased percentage of the specimen left at room temperature for a period time, represented by (increased length)/(original length of the specimen)×100 under the hot condition, and Set (%) refers to the percentage, represented by (decreased length)/(original length)×100 after standing the specimen at the same temperature without applying a load. Through this, a room temperature crosslinking degree may be measured.

(5) Extrusion property: a satisfactory degree determined by smooth exterior, when performing extrusion using the extruder, was evaluated.

It is recognized from the results that in the case of adding magnesium stearate or stearic acid as a crosslinking aid, as in Examples 1 and 3, excellent exterior and crosslinking degree were obtained, and even in the case of a mild crosslinking rate, very excellent exterior of the surface were resulted by rapid progress, and in particular in the case of Example 1, even a very good exterior was implemented.

Further, in the case of adding stearic acid as a crosslinking aid, as in Example 2, it is recognized that productivity was very excellent with a very rapid progress of crosslinking time, and in particular, an excellent effect of generating room temperature crosslinking within 3 days occurred. However, it was recognized that due to rapid crosslinking, a relatively slightly different exterior from Example 1 was obtained.

Accordingly, it was recognized that in the case of the present invention, crosslinking proceeds with time, thereby obtaining a material having better physical properties. That is, Examples according to the present invention represented improved mechanical physical properties so that sufficient room temperature crosslinking proceeds within about 1 week, not to be broken.

From the results of the Examples, it was recognized that the present invention has sufficient physical properties such as tensile, elongation, and retention, thereby being used as a sheath for cables, and also has a sufficient room temperature crosslinking effect, and particularly, has an accelerated crosslinking rate when adding the crosslinking aid, thereby representing very excellent effects.

The wires and cables manufactured from the room temperature crosslinked type halogen-free flame retardant resin composition of the present invention have remarkably excellent flexibility as well as flame retardancy.

Further, the sheath molded article according to the present invention has the advantageous effects of improved mechanical strength, improved thermal resistance, improved oil resistance, improved flexibility at an ultralow temperature, improved impact resistance and cold resistance by reduced usage amount of the traditional inorganic filler, improved flame retardancy and mitigated gas toxicity by char formation facilitation during combustion, improved dimensional stability, and an increased product value by a smooth surface property of the exterior of an extruded wire.

Further, the present invention may sufficiently display the effects with a small amount of flame retardant.

What is claimed is:

1. A method of preparing a halogen-free flame retardant resin composition which crosslinks at room temperature, comprising:

i) preparing a composition including a polyethylene resin, an olefin-based elastomer, a metal hydroxy compound, an alkoxysilane-based compound containing a crosslinkable group, and a radical initiator, ii) kneading the composition to graft the alkoxysilane-based compound, iii) after the kneading, performing pelletization to prepare a compound material, iv) kneading and/or extruding a composition including a polyethylene resin, a condensation catalyst of the alkoxysilane-based compound, and one or more crosslinking aids selected from the group consisting of an aliphatic acid and an aliphatic acid metal salt to prepare a masterbatch, and v) mixing, kneading or extruding the compound material and the masterbatch.

2. The method of claim 1, wherein the flame retardant resin composition includes 10 to 100 parts by weight of the olefin-based elastomer, 20 to 300 parts by weight of the metal hydroxy compound, 0.1 to 30 parts by weight of the alkoxysilane-based compound, 0.01 to 3 parts by weight of the radical initiator, 0.00001 to 3 parts by weight of the condensation catalyst of the alkoxysilane-based compound, and 0.0001 to 10 parts by weight of the crosslinking aid, based on 100 parts by weight of the polyethylene resin.

3. The method of claim 1, wherein the polyethylene resin of steps i) and iv) includes one or more selected from the group consisting of linear low-density polyethylene, low-density polyethylene, and medium-density polyethylene.

4. The method of claim 1, wherein the olefin-based elastomer includes one or more selected from the group consisting of ethylene-propylene copolymer rubber, ethylene-1-butene copolymer rubber, ethylene-1-hexene copolymer rubber, ethylene-1-octene copolymer rubber, ethylene-propylene-1-butene copolymer rubber, ethylene-propylene-1-hexene copolymer rubber, ethylene-propylene-1-octene copolymer rubber, ethylene-propylene-5-ethylidene-2-norbornene copolymer rubber, ethylene-propylene-dicyclopentadiene copolymer rubber, ethylene-propylene-1,4-hexadiene copolymer rubber and ethylene-propylene-5-vinyl-2-norbornene copolymer rubber.

5. The method of claim 1, wherein the condensation catalyst of the alkoxysilane-based compound includes one or more selected from the group consisting of dialkyltin dialkylate, dodecylbenzenesulfonic acid, and 2,2-dibutyl-1,3,2-dioxastannolane.

6. The method of claim 1, wherein the crosslinking aid includes one or more selected from the group consisting of C4 to C20 aliphatic acids and metal salts thereof.

7. The method of claim 1, wherein the alkoxysilane-based compound of steps i), ii) and iv) includes one or more selected from the group consisting of vinyltrimethoxysilane, vinyltriethoxysilane, allyltrimethoxysilane, allyltriethoxysilane, vinylmethyldimethoxysilane, vinyl tris(2-ketoxyethoxy)silane and methacryloyloxypropyl-trimethoxysilane.

8. A flame retardant composition which crosslinks at room temperature for a cable, prepared by the method of claim 1.

9. A method of preparing a halogen-free flame retardant resin composition which crosslinks at room temperature, comprising:

i) preparing a composition including a polyethylene resin, an olefin-based elastomer, a metal hydroxy compound, an alkoxysilane-based compound containing a crosslinkable group, a radical initiator, a condensation catalyst of the crosslinked type alkoxysilane-based compound, and one or more crosslinking aids selected from the group consisting of an aliphatic acid and an aliphatic acid metal salt,
ii) kneading the composition to graft the alkoxysilane-based compound, and
iii) after the kneading, performing pelletization.

10. The method of claim 9, wherein the flame retardant resin composition includes 10 to 100 parts by weight of the olefin-based elastomer, 20 to 300 parts by weight of the metal hydroxy compound, 0.1 to 30 parts by weight of the alkoxysilane-based compound, 0.01 to 3 parts by weight of the radical initiator, 0.00001 to 3 parts by weight of the condensation catalyst of the alkoxysilane-based compound, and 0.0001 to 10 parts by weight of the crosslinking aid, based on 100 parts by weight of the polyethylene resin.

* * * * *